United States Patent [19]
Ito

[11] Patent Number: 5,745,161
[45] Date of Patent: Apr. 28, 1998

[54] VIDEO CONFERENCE SYSTEM

[75] Inventor: Kan Ito, Tokyo, Japan

[73] Assignee: Canon Kabushiki Kaisha, Tokyo, Japan

[21] Appl. No.: 896,710

[22] Filed: Jul. 18, 1997

Related U.S. Application Data

[63] Continuation of Ser. No. 289,261, Aug. 11, 1994.

[30] Foreign Application Priority Data

Aug. 30, 1993 [JP] Japan .................................. 5-214375

[51] Int. Cl.⁶ .......................................................... H04N 7/12
[52] U.S. Cl. .............................. 348/15; 348/211; 379/202
[58] Field of Search ........................... 348/14–19, 211; 379/202, 205

[56] References Cited

U.S. PATENT DOCUMENTS

| | | | |
|---|---|---|---|
| 4,961,211 | 10/1990 | Tsugane et al. | 348/15 |
| 5,003,532 | 3/1991 | Ashida et al. | 348/15 |
| 5,206,721 | 4/1993 | Ashida et al. | 348/15 |
| 5,446,491 | 8/1995 | Shibata et al. | 348/15 |
| 5,515,099 | 5/1996 | Cortjens et al. | 348/15 |

*Primary Examiner*—Wing F. Chan
*Attorney, Agent, or Firm*—Robin, Blecker & Daley

[57] ABSTRACT

A video conference system, which is arranged to conduct a video conference among multiple points by communicating at least images and sounds among the multiple points, includes a monitor for displaying moving images respectively obtained from a plurality of connected stations on individual window screens, a pointing device for selecting one station from among the plurality of connected stations which respectively correspond to the moving images displayed on the individual window screens of the monitor, and a controller for enabling operating control of a camera disposed in a selected station.

30 Claims, 7 Drawing Sheets

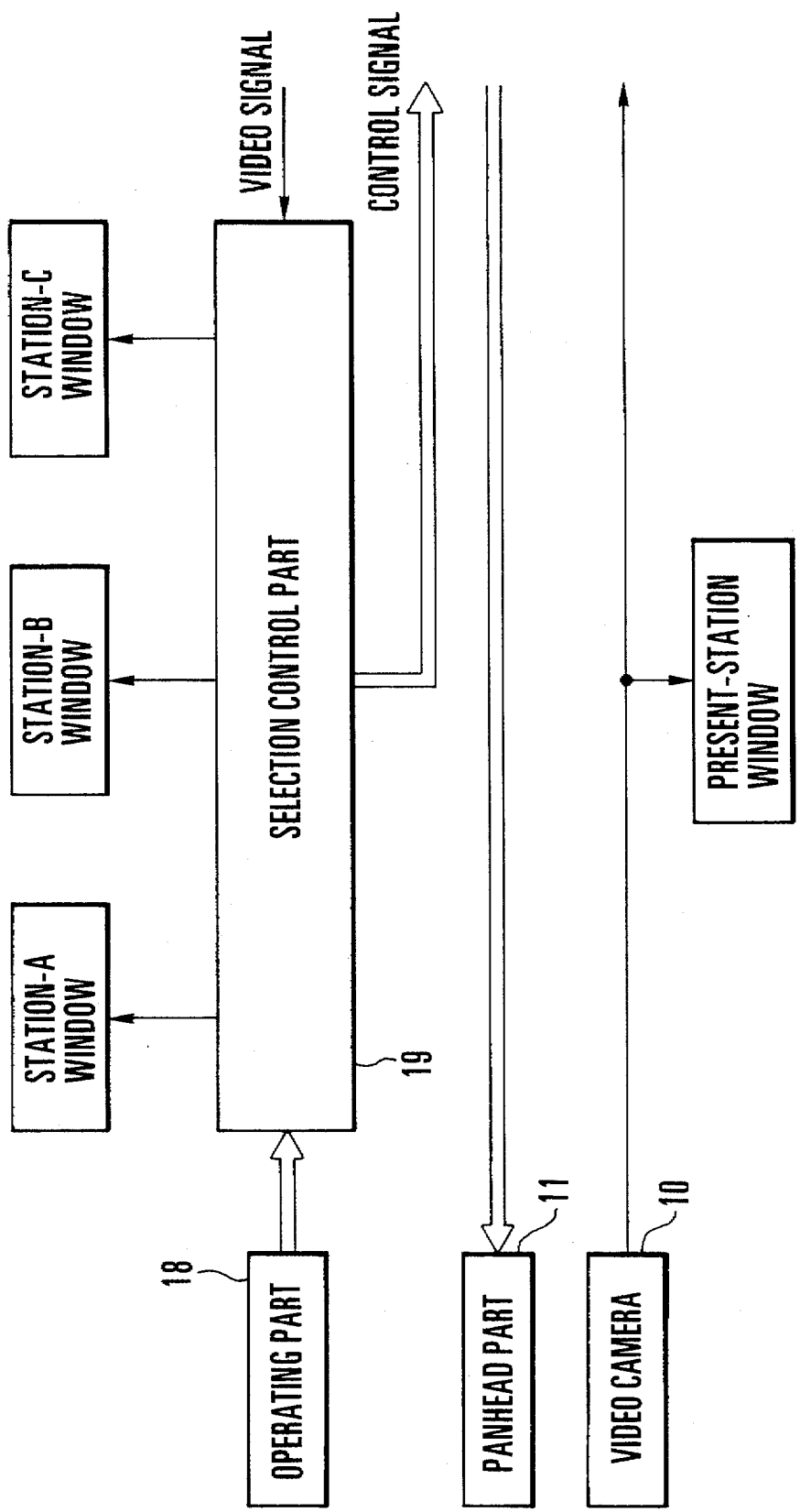

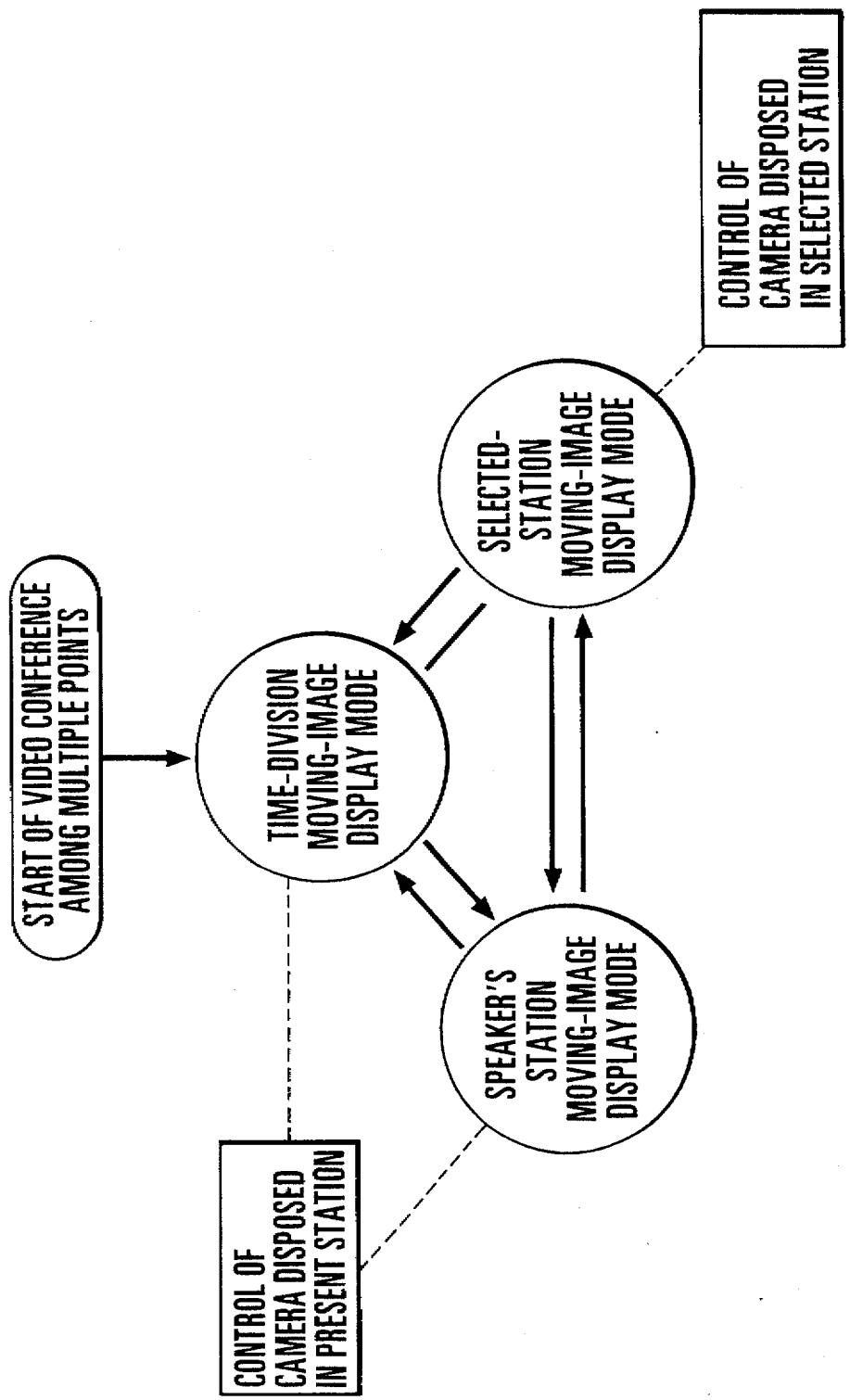

VIDEO CONFERENCE SYSTEM

This is a continuation application under 37 CFR 1.62 of prior application Ser. No. 08/289,261, filed Aug. 11, 1994.

BACKGROUND OF THE INVENTION

1. Field of the Invention

The present invention relates to a video conference system which enables a video conference to be held among multiple points.

2. Description of the Related Art

In recent years, digital communications lines have been beginning to spread, and video telephone/video conference systems using digital networks have received attention. The spread of communications systems requires standardization. There are five recommendations concerning images and sounds. H.221 defines the frame structures of channels of 64 Kbits/s to 1,920 Kbits/s, H.230 defines control signals and indicating signals as to frame synchronization, and H.242 defines interconnection procedures of up to 2 Mbits/s. H.261 defines a video coding system of P×64 Kbits/s, and H.320 defines communication system arrangements for sounds and images.

In multiple-points interconnection video conferences, it has presently been common practice to adopt star connection systems, such as that shown in FIG. 1. There are a number of methods for displaying moving images obtained from remote stations, for example, a method of switching images obtained from a plurality of stations in a time-division manner, a method of displaying an image obtained from a station in which speaking is occurring, and a method of setting a plurality of windows and assigning moving images obtained from remote stations to the respective windows in a fixed manner.

However, the method of switching images obtained from a plurality of stations in a time-division manner and the method of displaying an image obtained from a station in which speaking is occurring have the problem that it is impossible to operate (for example, pan, tilt or zoom) a camera disposed in a remote station. If a camera disposed in a particular remote station is to be operated, it is necessary to set the state of display of a monitor so that a moving image obtained from the particular remote station can be displayed on a monitor screen in a fixed manner. As a result, it is impossible to utilize the merits of communications among multiple points.

SUMMARY OF THE INVENTION

It is, therefore, an object of the present invention to solve the above-described problems.

Another object of the present invention is to provide a video conference system which makes it possible to easily operate a camera disposed in a remote station.

To achieve the above objects, in accordance with one aspect of the present invention, there is provided a video conference system arranged to conduct a video conference among multiple points by communicating at least images and sounds among the multiple points, which system comprises display means for displaying moving images respectively obtained from a plurality of connected stations on individual window screens, station selecting means for selecting one station from among the plurality of connected stations which respectively correspond to the moving images displayed on the individual window screens of the display means, and control means for enabling operating control of a camera disposed in the station selected by the station selecting means.

In accordance with another aspect of the present invention, there is provided a video conference system arranged to conduct a video conference among multiple points by communicating at least images and sounds among the multiple points, which system comprises display means for displaying moving images respectively obtained from a plurality of connected stations on individual window screens, station selecting means for selecting one station from among the plurality of connected stations which respectively correspond to the moving images displayed on the individual window screens of the display means, and mode selecting means for selecting one mode from among a first mode in which moving images respectively transmitted from the plurality of connected stations are displayed in a time-division manner, a second mode in which only an image transmitted from a station in which speaking is occurring is displayed as a moving image, while images transmitted from the others of the plurality of connected stations are respectively displayed as still images, and a third mode in which only an image transmitted from a station selected from among the plurality of connected stations is displayed as a moving image.

The above and other objects, features and advantages of the present invention will become apparent from the following detailed description of a preferred embodiment of the present invention, taken in conjunction with the accompanying drawings.

BRIEF DESCRIPTION OF THE DRAWINGS

FIG. 6 is a schematic block diagram showing the construction of a window switching control system; and FIG. 7 shows the state of transition from one display mode to another.

DETAILED DESCRIPTION OF THE PREFERRED EMBODIMENT

An embodiment of the present invention will be described below with reference to the accompanying drawings.

Figure 1:
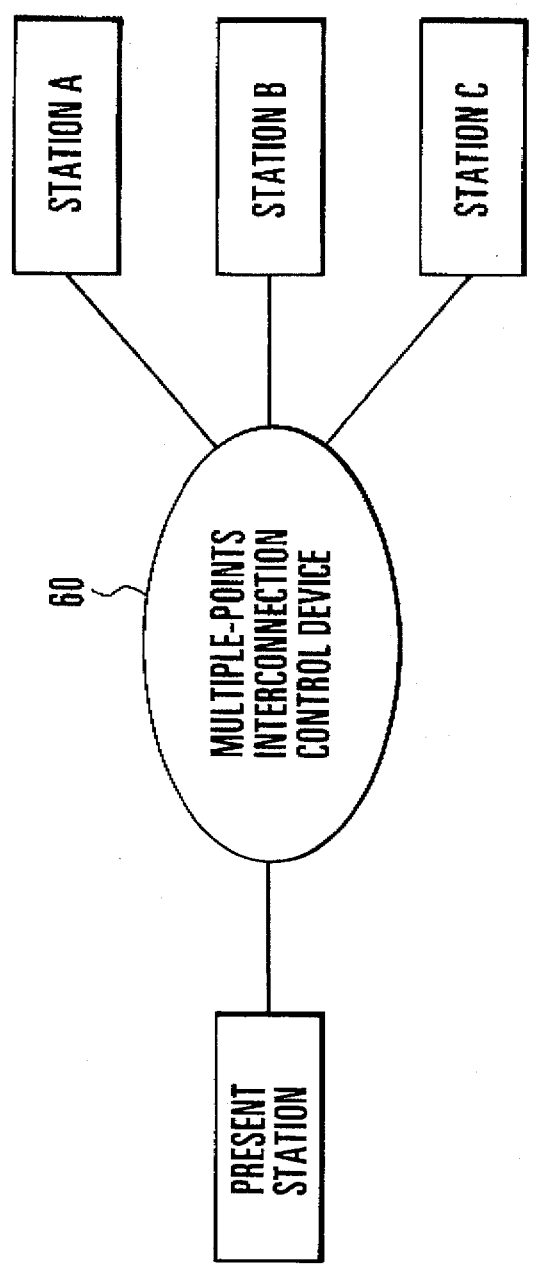
FIG. 1 is an explanatory view of a star connection for a multiple-points interconnection video conference.
Figure 2:
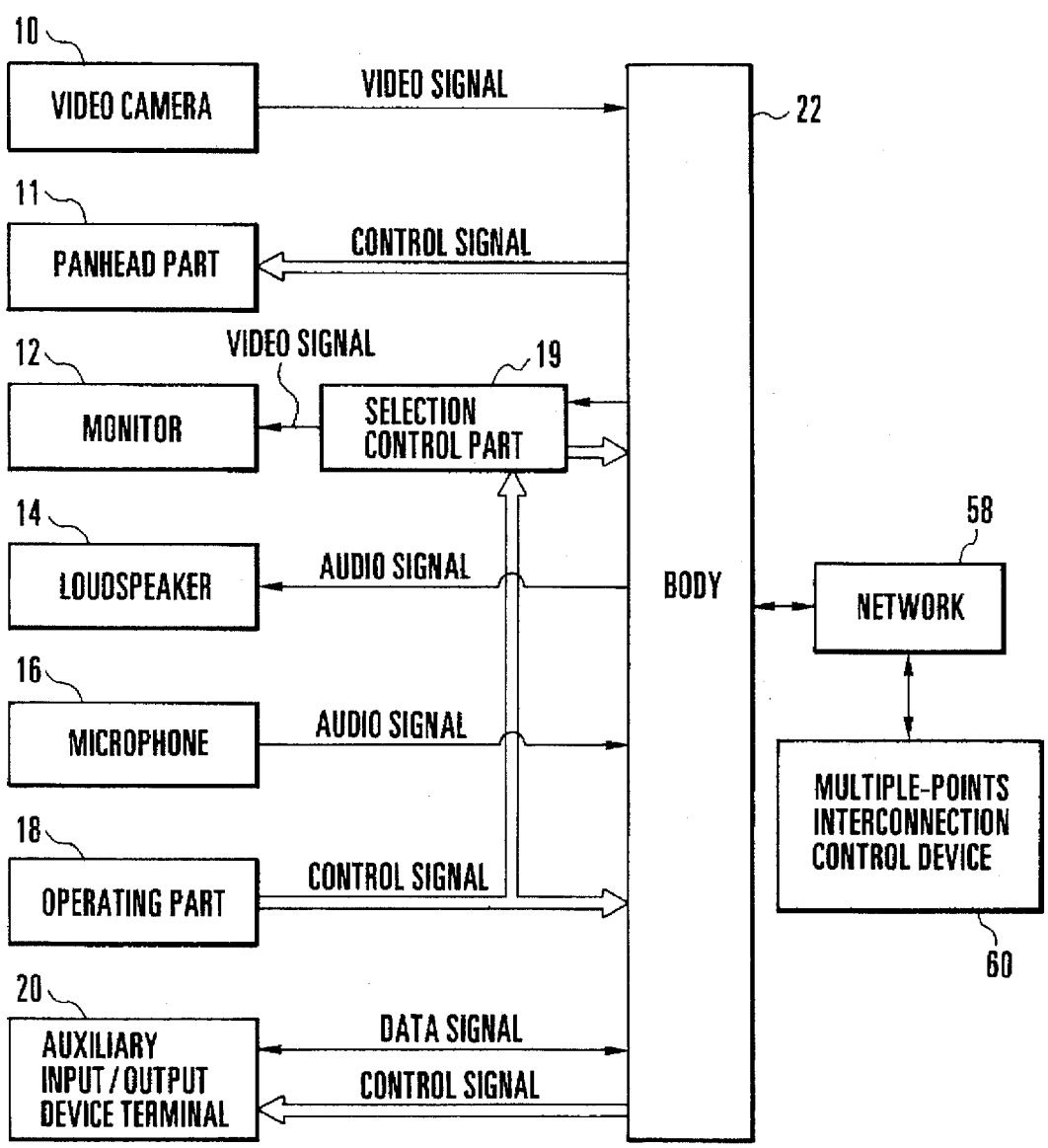
FIG. 2 is a schematic block diagram showing the arrangement of an embodiment of the present invention.

FIG. 2 is a schematic block diagram of the arrangement of a video conference terminal according to the embodiment of the present invention. The arrangement shown in FIG. 2 includes a video camera 10 disposed in a station for picking up an image of a conference participant and others situated in this station (hereinafter referred to as "the present station"), a panhead part 11 for providing movement control over the video camera 10 to cause it to perform various movements such as panning and tilting, a monitor 12 for visually displaying a picked-up image or images obtainable from the present station and/or remote conference-participant stations, a loudspeaker 14, a microphone 16, and an operating part 18 disposed in the present station for providing control operations, such as the operation of controlling movements, such as panning, tilting and zooming, of the video camera 10 disposed in the present station as well as those of cameras disposed in the remote stations, and the operation of selecting a desired one from among the cameras. In the present embodiment, the operating part 18 is displayed as a window on a display screen 12a of the monitor 12, as will be described later. The shown arrangement also includes a selection control part 19 for selecting a window corresponding to a transmitted video signal and causing the monitor 12 to visually display the transmitted video signal in the selected, corresponding window, as will be described in detail later. The selection control part 19 serves also to transmit a control signal supplied from the operating part 18 to a multiple-points interconnection control device 60 via a body 22. The shown arrangement also includes an auxiliary input/output device terminal 20, such as a computer keyboard, a still-image input device, a graphic input digitizer or a sub-monitor for displaying an image supplied from another auxiliary device, and the body 22 of the video conference terminal which constitutes part of a video conference system. The present and remote stations are each provided with the arrangement shown in FIG. 2, and are capable of communicating with one another via a communication network 58.

Figure 3:
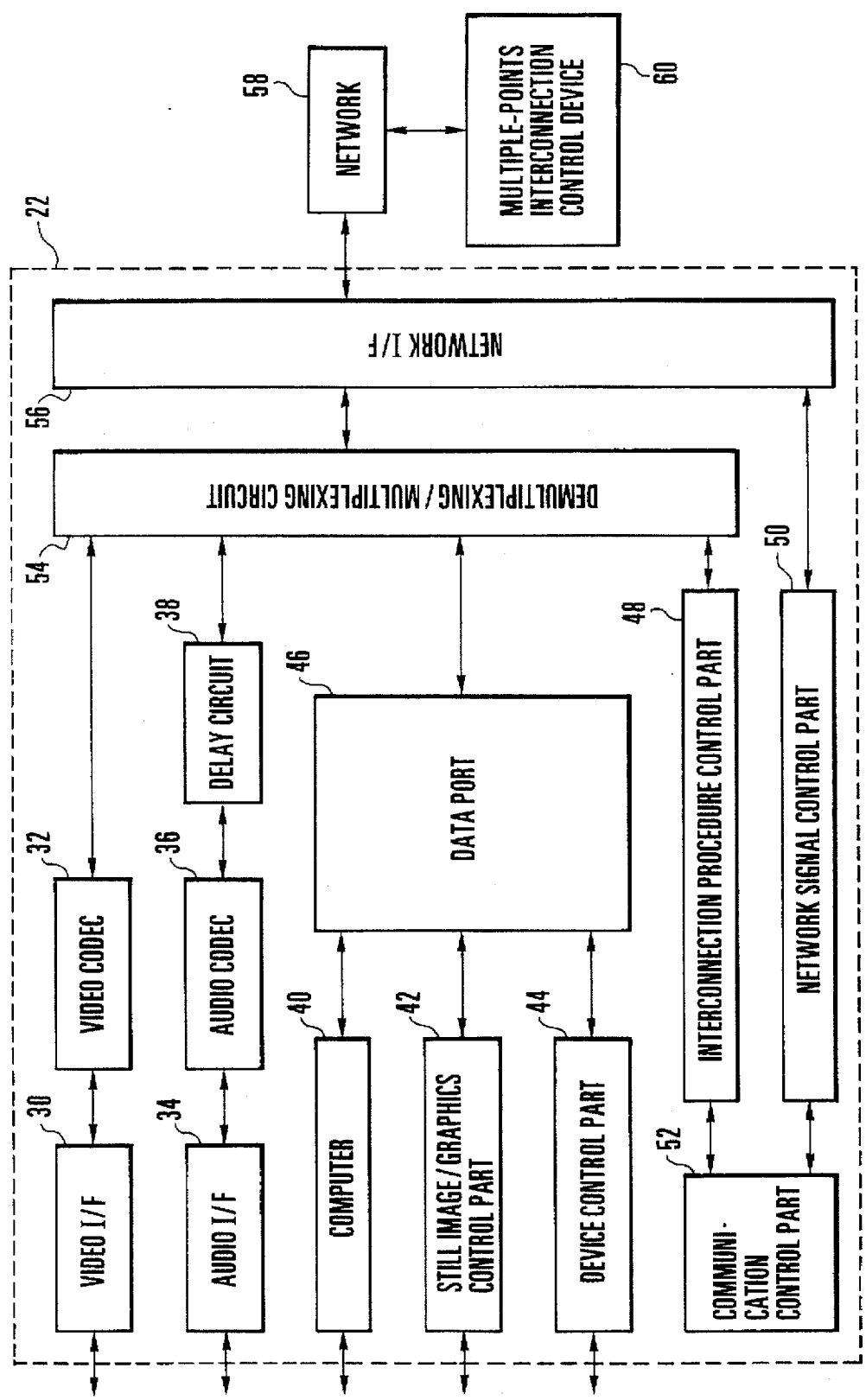
FIG. 3 is a schematic block diagram showing the construction of a body 22.

FIG. 3 shows the details of the body 22. In the body 22 shown in FIG. 3, a video interface 30 is provided for connection with the camera 10 and the monitor 12, and has an image processing function, such as screen division, image combination and character combination. A video coding-decoding circuit (CODEC) 32 is provided for coding a video signal supplied from the video interface 30 or decoding received coded video information.

In the body 22 shown in FIG. 3, an audio interface 34 is provided for connection with the loudspeaker 14 and the microphone 16, and has an audio processing function such as an echo cancelling function. An audio coding-decoding circuit (CODEC) 36 is provided for coding an audio signal supplied from the audio interface 34 or decoding received coded audio information. A delay circuit 38 is provided for delaying audio information coded by the audio coding-decoding circuit 36 or received coded audio information by a predetermined time period. The delay circuit 38 serves to synchronize audio information with video information.

The body 22 also includes a computer 40 for providing a video conference function and a computer conference function, a still image/graphics control part 42 for controlling the still-image input/output and the graphic input/output of the auxiliary input/output device terminal 20, a device control part 44 for executing control of each terminal device, and a data port 46 for executing data transfer to and data reception from the auxiliary input/output device terminal 20 via the computer 40, the still image/graphics control part 42 and the device control part 44.

The body 22 also includes an interconnection procedure control part 48 for controlling interconnections via the network 58, a network signal control part 50 for providing control such as end/end control for establishing a common mode which allows communication to be conducted among video conference terminals, and a communication control part 52 for collectively controlling communication by means of the interconnection procedure control part 48 and the network signal control part 50.

The body 22 includes a demultiplexing/multiplexing circuit 54 for multiplex transmission of data, a network interface 56 for connection with the communication network 58, and the multiple-points interconnection control device 60 which interconnects video conference terminals disposed at multiple points and enables a video conference to be held among t he multiple points.

Figure 4:
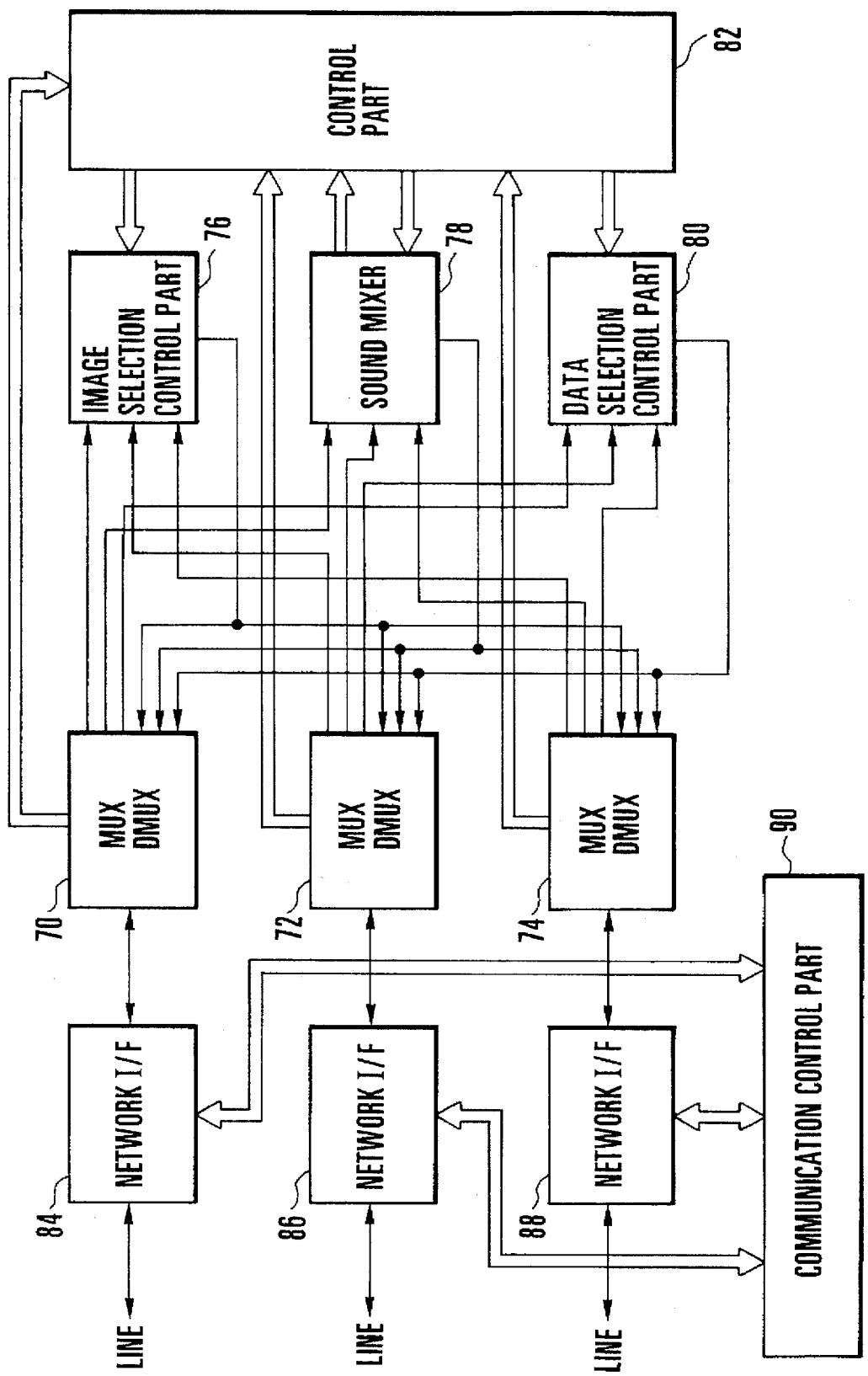
FIG. 4 is a schematic block diagram showing the construction of a multiple-points interconnection control device 60.

FIG. 4 is a block diagram showing the internal construction of the multiple-points interconnection control device 60. The multiple-points interconnection control device 60 includes multiplexing/demultiplexing circuits 70, 72 and 74 for multiplexing or demultiplexing information (image, sound and others) to be transmitted, an image selection control part 76 for selecting data to be distributed from among moving-image data received from the respective stations, a sound mixer 78 for mixing audio data received from the respective stations, a data selection control part 80 for selectively distributing still-image data, computer data and other data, and a control part 82 for controlling the image selection control part 76, the sound mixer 78 and the data selection control part 80.

The multiple-points interconnection control device 60 also includes network interfaces 84, 86 and 88 for connecting the device 60 shown in FIG. 4 to the communication network 58, and a communication control part 90 for controlling network access to each of the stations.

The operation of the present embodiment will be described below with reference to FIG. 5 which shows a display example of a moving image according to the present embodiment and FIG. 6 which shows the construction of a display control part.

To start a video conference among multiple points, the respective stations located at the multiple points issue calls to the multiple-points interconnection control device 60 (i.e., issue instructions to connect the respective stations to the video conference system), so that the multiple-points interconnection control device 60 provides connections among the multiple points, thereby starting the video conference. At the time when the video conference is started, a time-division moving-image display mode (a first mode) is set in the video conference system. In the case of the time-division moving-image display mode, before the multiple-points interconnection control device 60 provides connections among the multiple points, an image picked up by the video camera in the present station is displayed in a window 13D of the display screen 12a of the monitor 12 in advance. At the time when the respective stations located at the multiple points issue the calls to the multiple-points interconnection control device 60 so that the multiple-points interconnection control device 60 is connected to the stations, the multiple points are connected to one another, moving images transmitted from the respective connected stations are displayed in windows 13A, 13B and 13C on the display screen 12a of the monitor 12 which correspond to the respective connected stations (in the present embodiment, remote stations A, B and C). The moving images transmitted from the respective stations immediately after the stations have been connected to the multiple-points interconnection control device 60 are transmitted to the present station from the multiple-points interconnection control device 60 in a time-division manner by the image selection control part 76 being switched by the control part 82 shown in FIG. 4. If the present station and the multiple-points interconnection control device 60 are connected by a line which does not have a large capacity, image information from any one of the connected stations is transmitted to the present station at any time. Accordingly, while image information transmitted from one station is being displayed as a moving image, image information from the remaining stations is displayed as still images. During this time, the control part 82 shown in FIG. 4 sequentially switches the image selection control part 76 with the passage of time, whereby the images received from the remote stations A, B and C and displayed in the respective windows 13A, 13B and 13C are repeatedly switched between the state of a still image and the state of a moving image in sequence with the passage of time.

Another display mode is a speaker's station moving-image mode (a second mode) in which image information transmitted from a station in which a speaking conference participant is situated is displayed as a moving image. In the case of the speaker's station moving-image mode, if a conference participant in an arbitrary station speaks, audio information as well as video information are transmitted to the multiple-points interconnection control device 60. Audio information demultiplexed by the multiplexing/demultiplexing circuit 70 (72 or 74) shown in FIG. 4 is inputted to the sound mixer 78. The sound mixer 78 determines which station has transmitted the audio information, and on the basis of the decision output from the sound mixer 78, the control part 82 switches and controls the image selection control part 76. In other words, each time a conference participant in a remote station speaks, the still image displayed on a window corresponding to the remote station is switched to a moving image.

Figure 5:
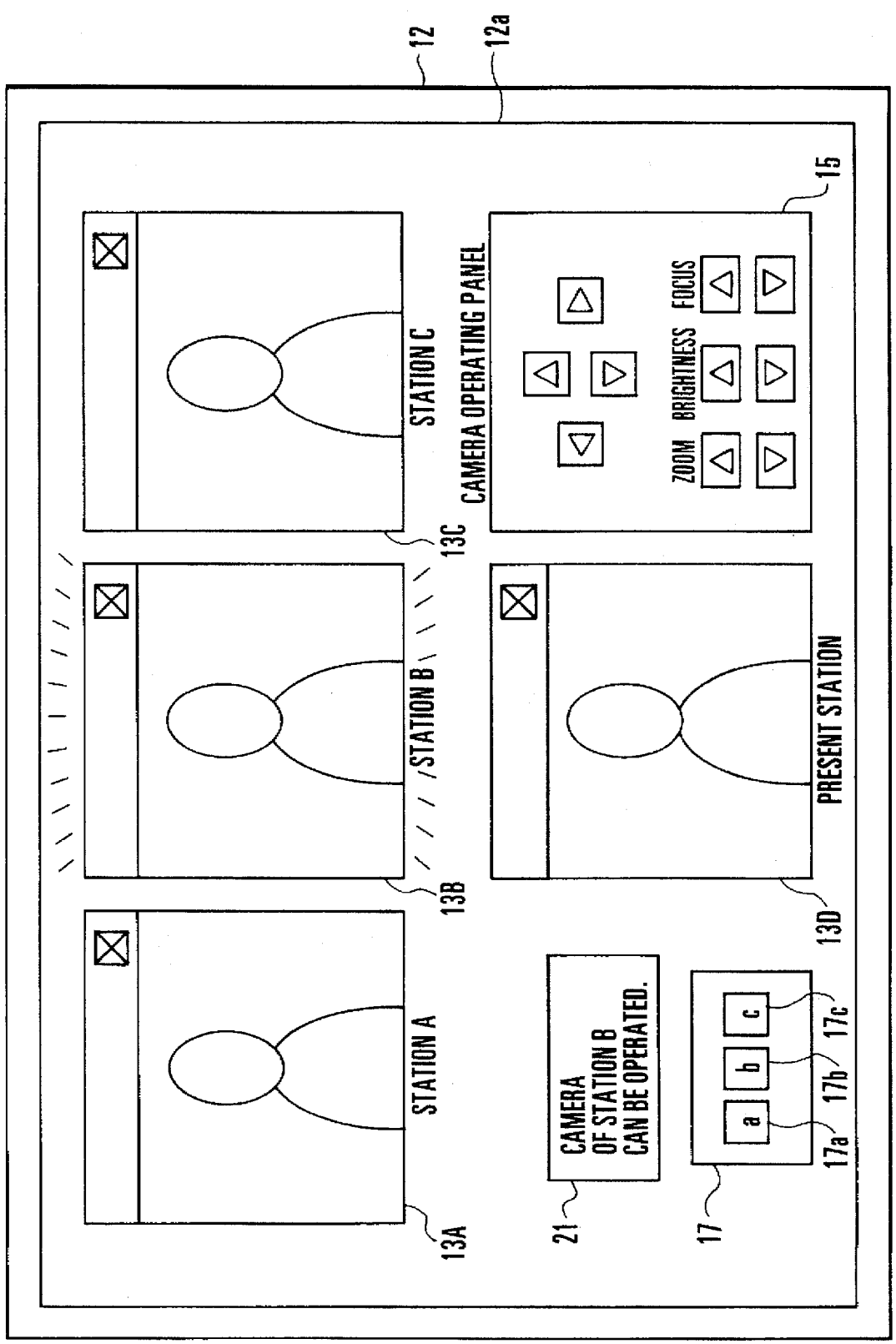
FIG. 5 shows one example of a display provided on a monitor screen according to the present embodiment.

In each of the first and second modes, control, such as panning, tilting, zooming and focusing, to be executed by using a camera operating panel window 15 on the display screen 12a shown in FIG. 5 can only be applied to the video camera 10 and the panhead part 11 which are disposed in the present station.

Still another mode is a selected station moving-image display mode (third mode) in which a video camera disposed in a selected station can be controlled. Referring to FIG. 5, in the case of the selected station moving-image display mode, any one of the windows 13A, 13B, 13C and 13D which correspond to the remote stations A, B and C and the present station, displayed on the display screen 12a of the monitor 12, is selected by a conference participant by means of a pointing device such as a mouse or a touch pen. To definitely inform the conference participant which the selected window is, the selected window is flashed as shown in FIG. 5, or the color of the frame of the selected window is changed, or a window 21 indicating which window corresponds to the selected station is separately provided. This control is executed by the device control part 44. A signal indicative of the selected station is transmitted to the multiple-points interconnection control device 60 by the selection control part 19, and the control part 82 (refer to FIG. 4) executes switching control of the image selection control part 76 in accordance with the signal. The multiple-points interconnection control device 60 causes the station in which the selection of the video camera 10 to be operated has been performed to display, as a moving image, a window which corresponds to the selected remote station, i.e., the station in which the video camera 10 desired to be operated is disposed, irrespective of time or the presence or absence of speaking. During this state, the conference participant operates the icon of the camera operating panel window 15 by using the pointing device, to control the video camera 10 and the panhead part 11 which are disposed in the selected station.

Any one of the first, second and third modes can be selected by selecting a desired icon from among icons 17a, 17b and 17c in a mode switching window 17 on the display screen 12a, and information indicative of icon selection is processed by the device control part 44. FIG. 7 shows the state of transition from one mode to another during the aforesaid mode switching process. As shown in FIG. 7, at the time when a video conference among multiple points is started, the first mode (time-division moving-image display mode) is set, as described previously, and the time-division moving-image display mode, the speaker's station moving-image display mode and the selected station moving-image display mode can be switched from one to another. In the case of either of the time-division moving-image display mode and the speaker's station moving-image display mode, only a video camera disposed in the present station can be controlled, whereas, in the case of the selected station moving-image display mode, a video camera disposed in a desired station selected from among the present and remote stations can be controlled.

As is apparent from the foregoing description, in accordance with the present embodiment, it is possible to provide a video conference system which enables a conference participant situated in a particular station among a plurality of connected stations to remotely control a video camera and the like disposed in an arbitrary station, whether the particular station or a remote station, with images obtained from all the connected stations being displayed in individual windows in the particular station.

What is claimed is:

1. A video conference system arranged to conduct a video conference among multiple interconnected stations having camera by communicating at least images and sounds among the multiple stations, comprising:

(a) display means for displaying moving images respectively obtained from the stations on individual windows on a screen of said display means;

(b) station selecting means for selecting one station from among the plurality of stations by selecting one window from said windows on the screen of said display means; and (c) control means for enabling operating control of a camera disposed in the station selected by said station selecting means.

2. A video conference system according to claim 1, wherein said display means is controlled to provide visible indication of the selected station.

3. A video conference system according to claim 1, wherein said control means includes a control window displayed on the screen of said display means.

4. A video conference system according to claim 1, wherein said display means is disposed at a selected one of said stations and separately displays an image obtained from the selected one station and images obtained from others of said stations.

5. A video conference system according to claim 1 or 4, wherein said station selecting means includes a pointing device for selecting the window on the screen of said display means.

6. A video conference system arranged to conduct a video conference among multiple interconnected stations having cameras by communicating at least images and sounds among the stations, comprising:

(a) display means for displaying images respectively obtained from said stations on individual screens;

(b) station selecting means for selecting one station from among said stations mode selecting means for selecting a system operating mode from among a first mode in which moving images respectively transmitted from said stations are displayed by said display means in a time-division manner, a second mode in which only an image transmitted from a station in which speaking is occurring is displayed as a moving image, while images transmitted from the others of said stations are respectively displayed by said display means as still images, and a third mode in which only an image transmitted from a station selected by said station selecting means is displayed by said display means as a moving image.

7. A video conference system according to claim 6, further comprising control means for executing operating control of a camera to obtain an image.

8. A video conference system according to claim 7, wherein when the third mode is selected by said mode selecting means, a camera disposed in a station other than a station in which said display means is disposed is controllable by said control means.

9. A video conference system according to claim 7, wherein when the first or second mode is selected by said mode selecting means, a camera disposed in a station in which said display means is disposed is controllable by said control means.

10. A control device for a plurality of image input devices, comprising:
(a) display means for displaying moving images respectively obtained from said image input devices on individual windows on a screen of said display means;
(b) selecting means for selecting one image input device from among said image input devices by selecting one window from said windows on the screen of said display means; and
(c) control means for controlling the image input device selected by said selecting means.

11. A control device according to claim 10, wherein said display means displays identification of the selected image input device.

12. A control device according to claim 10, wherein said control means includes a control window displayed on the screen of said display means.

13. A control device according to claim 10, wherein said selecting means includes a pointing device for selecting the window on the screen of said display means.

14. A control device for a plurality of image input devices, comprising:
(a) display means for displaying moving images respectively obtained from said image input devices on individual screens;
(b) selecting means for selecting one image input device from among said image input devices; and
(c) mode selecting means for selecting a device operating mode from among a first mode in which moving images respectively transmitted from said image input devices are displayed by said display means in a time-division manner, a second mode in which an image transmitted from a particular image input device is displayed by said display means as a moving image, while images transmitted from others of said image input devices are respectively displayed by said display means as still images, and a third mode in which an image transmitted from an image input device selected by said selecting means is displayed as a moving image.

15. A control device according to claim 14, further comprising control means for executing operating control of the image input devices to obtain the images.

16. A control device for a plurality of image input devices, comprising:
(a) display means for displaying moving images respectively obtained from said image input devices on individual screens;
(b) selecting means for selecting one image input device from among said image input devices; and
(c) mode selecting means for selecting as a device operating mode one mode from a first mode in which moving images respectively transmitted from the plurality of image input devices are displayed by said display means in a time-division manner and a second mode in which an image transmitted from an image input device selected by said selecting means is displayed as a moving image, while images corresponding to the others of said image input devices are respectively displayed as still images.

17. A control device according to claim 16, further comprising control means for executing operating control of the image input devices to obtain the images.

18. A video conference system arranged to be capable of conducting a video conference among multiple interconnected stations having cameras by communicating images among the stations, comprising:
(a) display means at one of said stations for displaying images obtained from said one station and others of said stations on windows on a screen of said display means, said windows corresponding individually with said stations; and
(b) control means for selectively controlling said display means to cause said windows to display images obtained from said one station and said other stations as moving images or still images.

19. A system according to claim 18, wherein said control means selectively controls said display means to cause one of said screens to display the image obtained from said one station as a moving image and to display the images obtained from said other stations as still images.

20. A system according to claim 18, wherein said control means selectively controls said display means to cause one of said screens to display an image obtained from a station other than said one station as a moving image and to display the images obtained from said one station as a still image.

21. A system according to claim 18, wherein said display means further provides a display of a control window for said control means.

22. A system according to claim 18 further communicating sound among said stations, said control means being operably responsive to sound issuing from a station to cause said display means to display the image obtained from said station as a moving image.

23. A camera control system for controlling cameras of multiple interconnected stations, comprising:
(a) a display for displaying moving images respectively obtained from the stations on individual windows on a screen of said display;
(b) a station selector for selecting one station from among the plurality of stations by selecting one window from said windows on the screen of said display; and
(c) a controller for enabling operating control of a camera disposed in the station selected by said station selector.

24. A camera control system according to claim 23, wherein said display is controlled to provide visible indication of a selected station.

25. A camera control system according to claim 23, wherein said controller includes a control window displayed on the screen of said display.

26. A camera control system according to claim 23, wherein said display is disposed at a selected one of said stations and separately displays an image obtained from the selected one station and images obtained from others of said stations.

27. A camera control system according to claim 23, wherein said station selector includes a printing device for selecting a window on the screen of said display.

28. A camera control system according to claim 26, wherein said station selector includes a printing device for selecting a window on the screen of said display.

29. A method for controlling a plurality of image input devices, comprising:
   (a) displaying moving images respectively obtained from said image input devices on individual windows on a screen of a display;
   (b) selecting one image input device from among said image input devices by selecting one window from said windows on the screen of said display; and
   (c) controlling the selected image input device.

30. A method for controlling cameras of multiple interconnected stations, comprising:
   (a) displaying moving images respectively obtained from the stations on individual windows on a screen of a display;
   (b) selecting one station from among the plurality of stations by selecting one window from said windows on the screen of said display; and
   (c) enabling operating control of a camera disposed in the station selected.

* * * * *

UNITED STATES PATENT AND TRADEMARK OFFICE
CERTIFICATE OF CORRECTION

PATENT NO.   : 5,745,161
DATED        : April 28, 1998
INVENTOR(S)  : Kan Ito

It is certified that error appears in the above-identified patent and that said Letters Patent is hereby corrected as shown below:

Col. 4, line 3,    delete "t he"   and insert -- the --.

Col. 6, line 61,   delete "stations" and insert   -- stations; and (c) --.

Signed and Sealed this

Fifteenth Day of September, 1998

Attest:

BRUCE LEHMAN

Attesting Officer          Commissioner of Patents and Trademarks